(12) United States Patent
Bai et al.

(10) Patent No.: US 12,463,543 B2
(45) Date of Patent: Nov. 4, 2025

(54) APPARATUS FOR ESTIMATING OUTPUT CURRENT OF LOW-VOLTAGE DC-DC CONVERTER

(71) Applicant: HL Mando Corporation, Pyeongtaek-si (KR)

(72) Inventors: Changkyu Bai, Yongin-si (KR); Juhong Min, Seongnam-si (KR)

(73) Assignee: HL MANDO CORPORATION, Pyeongtaek-si (KR)

( * ) Notice: Subject to any disclaimer, the term of this patent is extended or adjusted under 35 U.S.C. 154(b) by 208 days.

(21) Appl. No.: 18/226,400

(22) Filed: Jul. 26, 2023

(65) Prior Publication Data
US 2024/0162823 A1 May 16, 2024

(30) Foreign Application Priority Data
Nov. 4, 2022 (KR) .................. 10-2022-0146102

(51) Int. Cl.
*H02M 3/335* (2006.01)
*H02M 1/00* (2006.01)

(52) U.S. Cl.
CPC ..... *H02M 3/33573* (2021.05); *H02M 1/0009* (2021.05)

(58) Field of Classification Search
CPC ......... H02M 3/33569; H02M 3/33571; H02M 3/33573; H02M 1/0009; H02M 3/33507
See application file for complete search history.

(56) References Cited

U.S. PATENT DOCUMENTS

| 2013/0328538 A1* | 12/2013 | Fox | H02M 3/156 |
| | | | 323/282 |
| 2014/0365151 A1* | 12/2014 | Han | H02M 3/156 |
| | | | 702/64 |
| 2020/0403516 A1* | 12/2020 | Kawamura | H02M 1/38 |

FOREIGN PATENT DOCUMENTS

| KR | 10-1461900 B1 | 11/2014 |
| KR | 10-1500079 B1 | 3/2015 |

(Continued)

OTHER PUBLICATIONS

Korean Office Action issued on Jun. 27, 2025, in connection with the corresponding Korean Patent Application No. 10-2022-0146102, citing the above reference(s), along with an English machine translation. (14 pages).

*Primary Examiner* — Alex Torres-Rivera
(74) *Attorney, Agent, or Firm* — Hauptman Ham, LLP

(57) ABSTRACT

The present disclosure relates to an apparatus for estimating an output current of the secondary side of a low-voltage DC-DC converter using a current transformer (CT) sensor connected to the primary side of the low-voltage DC-DC converter, the low-voltage DC-DC converter including the output current estimating apparatus, and a driving method thereof. The apparatus for estimating an output current of the low-voltage DC-DC converter includes: an input voltage meter for measuring an input voltage of the low-voltage DC-DC converter; a CT voltage meter for measuring a CT voltage correlated with an input current of the low-voltage DC-DC converter; an output voltage meter for measuring an output voltage of the low-voltage DC-DC converter; and an output current estimator that outputs an output current estimate by applying the input voltage, the CT voltage, and the output voltage to an estimation function of a multi-variable polynomial.

20 Claims, 7 Drawing Sheets

(56) References Cited

FOREIGN PATENT DOCUMENTS

| KR | 10-1575493 B1 | 12/2015 |
| KR | 10-2016-0140299 A | 12/2016 |
| KR | 10-2020-0124813 A | 11/2020 |

* cited by examiner

APPARATUS FOR ESTIMATING OUTPUT CURRENT OF LOW-VOLTAGE DC-DC CONVERTER

CROSS-REFERENCE TO RELATED APPLICATIONS

This application claims priority to and the benefit of Korean Patent Application No. 10-2022-0146102, filed on Nov. 4, 2022, with the Korean Intellectual Property Office, the disclosure of which is incorporated herein in its entirety by reference.

TECHNICAL FIELD

The present disclosure relates to an apparatus for estimating an output current of a low-voltage DC-DC converter, the low-voltage DC-DC converter using the same, and a driving method thereof, and more particularly, to an apparatus for estimating an output current of the secondary side of a low-voltage DC-DC converter using a current transformer (CT) sensor connected to the primary side of the low-voltage DC-DC converter, the low-voltage DC-DC converter including such an estimating apparatus, and a driving method thereof.

BACKGROUND

A low-voltage DC-DC converter (LDC), which is a DC power supply device utilized in eco-friendly vehicles such as HEVs, PHEVs, EVs, and FCVs, is an essential device that receives high-voltage battery power from the vehicle and either charges a low-voltage battery (12V) or supplies necessary power to electric components. The low-voltage DC-DC converter is a power conversion device that generates several kW of output power and requires stable voltage and current control of both an input terminal (primary side) and an output terminal (secondary side). In particular, in the case of current control, fast current control performance is essential to protecting components like power semiconductor devices and transformers used in the low-voltage DC-DC converter.

FIG. 1 is a circuit diagram showing a conventional low-voltage DC-DC converter. The low-voltage DC-DC converter 100 receives high-voltage energy from a high-voltage battery 110, converts it to low voltage, and then distributes it to a low-voltage battery 120 as well as various electric loads within the vehicle.

The low-voltage DC-DC converter 100 includes a full bridge switching unit 101 that includes four MOSFET switches M1, M2, M3, and M4, and converts a direct current (DC) high voltage of the high-voltage battery 110 into an alternating current (AC) through high-speed switching of the four MOSFET switches M1, M2, M3, and M4, a transformer $T_1$ for reducing the AC high voltage output from the full bridge switching unit 101, a rectifying unit 102 for rectifying the reduced AC voltage, and a smoothing unit 103, including an output inductor $L_o$ and an output capacitor $C_o$, which smoothes the rectified AC voltage and converts it into DC to supply it to the low-voltage battery 120 and the electric loads.

The four MOSFET switches M1, M2, M3, and M4, which make up the full bridge switching unit 101, are turned on/off by pulse width modulation (PWM) signals input from a converter controller 130. The converter controller 130 receives input voltage $V_{in}$, output voltage $V_{out}$, and output current $I_{out}$, and generates four PWM signals that turn on/off the respective MOSFET switch M1, M2, M3, and M4 at regular intervals to perform switching control by applying them to gate terminals of the corresponding MOSFET switches M1, M2, M3, and M4, respectively.

The rectifying unit 102 includes a rectifying diode. The smoothing unit 103 is for smoothing the voltage output from the rectifying unit 102 and includes an LC filter to which the output inductor $L_o$ and the output capacitor $C_o$ are connected in parallel at the output terminal of the rectifying unit 102.

A current transformer (CT) sensor 104 is connected to the primary side of the low-voltage DC-DC converter 100 to protect people and equipment from overcurrent by limiting the overcurrent exceeding a normal load current in the low-voltage DC-DC converter 100. In addition, the converter controller 130 generates a PWM signal for controlling the MOSFET switches M1, M2, M3, and M4 based on the input voltage $V_{in}$, output voltage $V_{out}$, and output current $I_{out}$ of the low-voltage DC-DC converter 100. To this end, a current sensor 105 for measuring the output current $I_{out}$ is connected to the secondary side of the low-voltage DC-DC converter 100.

In order to improve the overall fuel efficiency of the vehicle, it is necessary to optimally control the output current $I_{out}$ of the low-voltage DC-DC converter 100 that supplies power to the electric loads and the low-voltage battery 120. The current sensor 105 uses a Hall sensor to accurately measure the output current $I_{out}$, and the measured output current $I_{out}$ is supplied to the converter controller 130 to be used to control MOSFET switches M1, M2, M3, and M4.

As such, the conventional low-voltage DC-DC converter 100 measures the output current $I_{out}$ using the separate current sensor 105. That is, in the low-voltage DC-DC converter 100, two devices (CT sensor and Hall sensor) for measuring current are used redundantly, which causes an increase in material cost.

Accordingly, many conventional techniques have been proposed for estimating the output current of the low-voltage DC-DC converter 100 using the CT sensor 104 connected to the primary side without the current sensor 105 on the secondary side of the low-voltage DC-DC converter 100.

The CT sensor 104 has a low unit price, but has a disadvantage due to large nonlinearity depending on input voltage, output voltage, and load, and various attempts have been made to correct such nonlinearity of the CT sensor 104 in the conventional techniques.

Conventional methods for estimating the output current using a CT sensor include a correction step of correcting the measured CT voltage of the CT sensor based on the output voltage, and an estimation step of estimating the output current by applying the corrected CT voltage to the current map. These conventional techniques have a problem in that the estimation accuracy of the output current is lowered due to the accumulation of errors through the correction step and the estimation step.

In addition, since the calculation is complicated and the amount of calculation increases in the correction step, there is a problem in that the time required for estimation increases.

Moreover, there are problems in that a large-capacity memory is required to store the current map, it is difficult to create the current map that matches the measured voltages of all CT sensors, and a separate additional calculation needs to be performed to estimate the output current corresponding to the measured voltage of the CT sensor, which is not included in the current map.

PRIOR ART DOCUMENT

Patent Document

Korean Patent No. 10-1461900
Korean Patent No. 10-1500079
Korean Patent No. 10-1575493

SUMMARY

In view of the above, the present disclosure provides an apparatus for estimating an output current of a low-voltage DC-DC converter using input current measured through a CT sensor of the low-voltage DC-DC converter.

In addition, the present disclosure provides an apparatus for generating an estimation function of a multi-variable polynomial by curve fitting a plurality of measured values and estimating an output current of a low-voltage DC-DC converter using the estimation function.

Moreover, the present disclosure provides an apparatus for generating an estimation function with a minimized error rate by reflecting the magnitude of a measured value in a cost function of the estimation function and estimating an output current of a low-voltage DC-DC converter using the estimation function.

However, the technical objects to be achieved by the present embodiment are not limited to the technical objects as described above, and other technical objects may exist.

An apparatus for estimating an output current of a low-voltage DC-DC converter, according to one embodiment of the present disclosure, includes: an input voltage meter for measuring an input voltage of the low-voltage DC-DC converter; a CT voltage meter for measuring a CT voltage correlated with an input current of the low-voltage DC-DC converter; an output voltage meter for measuring an output voltage of the low-voltage DC-DC converter; and an output current estimator that outputs an output current estimate by applying the input voltage, the CT voltage, and the output voltage to an estimation function of a multi-variable polynomial.

The estimation function may be defined by the cubic polynomial of the following Equation 1, $$I_{o\_est} = f(X, Y, Z) = \quad \text{(Equation 1)}$$
$$A + B \cdot X + C \cdot Y + D \cdot Z + E \cdot XY + F \cdot YZ + G \cdot ZX + H \cdot X^2 +$$
$$I \cdot Y^2 + J \cdot Z^2 + K \cdot XYZ + L \cdot X^2Y + M \cdot XY^2 + N \cdot Y^2Z +$$
$$O \cdot YZ^2 + P \cdot Z^2X + Q \cdot ZX^2 + R \cdot X^3 + S \cdot Y^3 + T \cdot Z^3$$

where, $I_{o\_est}$ is the output current estimate, $f(X,Y,Z)$ is the estimation function, variable X is the CT voltage $V_{CT}$, variable Y is the input voltage $V_{in}$, variable Z is the output voltage $V_{out}$, and the constant A and the coefficients B, C, ..., T of the respective variable terms of the estimation function are values minimizing a cost function of the estimation function calculated as the weighted sum of squares based on a measured output current value and the output current estimate.

The cost function of the estimation function may be defined by the following Equation 2, $$WSS(\beta, \vec{\omega}) = \frac{1}{n}\sum_{i=1}^{n}\omega_i(y_i - \vec{x_i} \cdot \beta)^2 \quad \text{(Equation 2)}$$

where $y_i$ is the measured output current value, $x_i \cdot \beta$ is the output current estimate $I_{o\_est}$ as a result of $f(X,Y,Z)$, and $\beta$ is a set of the constant and the coefficients of the respective variable terms of $f(X,Y,Z)$, that is, A, B, ..., T in Equation 1, $\vec{\omega}$ is a set of weights $\omega_i$, and the weights $\omega_i$ are values determined based on the measured output current value $y_i$, and n is the number of measurement data sets used to derive the estimation function.

The weight $\omega_i$ may be determined as $1/(y_i)^2$.

The output current estimator may include at least two or more multi-variable polynomial estimation functions, and calculate the output current estimate by using an estimation function according to a mode state of the low-voltage DC-DC converter among the at least two or more estimation functions.

The mode state of the low-voltage DC-DC converter may be determined by at least one of the input current calculated based on the CT voltage, a temperature, and the output voltage.

The mode state of the low-voltage DC-DC converter may include a low current mode, a medium current mode and a high current mode of the input current.

A low-voltage DC-DC converter according to one embodiment of the present disclosure includes: a full bridge switch that converts a direct current (DC) high voltage of a high-voltage battery into an alternating current (AC) through high-speed switching of a plurality of MOSFET switches; a transformer for stepping down the AC high voltage output from the full bridge switch; a rectifier & smoothing circuit that rectifies and smoothes the stepped down AC voltage, converts it into DC voltage, and supplies it to a low-voltage battery and an electric load; a CT sensor for detecting an input current; an input voltage meter for measuring an input voltage; a CT voltage meter for measuring a CT voltage correlated with the input current; an output voltage meter for measuring the output voltage; an output current estimator that outputs an output current estimate by applying the input voltage, the CT voltage, and the output voltage to an estimation function of a multi-variable polynomial; and a converter controller that generates a PWM signal for controlling each of the plurality of MOSFET switches based on the input voltage, the output voltage, and the output current estimate.

In the low-voltage DC-DC converter, the estimation function may be defined by the cubic polynomial of the following Equation 1, $$I_{o\_est} = f(X, Y, Z) = \quad \text{(Equation 1)}$$
$$A + B \cdot X + C \cdot Y + D \cdot Z + E \cdot XY + F \cdot YZ + G \cdot ZX + H \cdot X^2 +$$
$$I \cdot Y^2 + J \cdot Z^2 + K \cdot XYZ + L \cdot X^2Y + M \cdot XY^2 + N \cdot Y^2Z +$$
$$O \cdot YZ^2 + P \cdot Z^2X + Q \cdot ZX^2 + R \cdot X^3 + S \cdot Y^3 + T \cdot Z^3$$

where, $I_{o\_est}$ is the output current estimate, $f(X,Y,Z)$ is the estimation function, variable X is the CT voltage $V_{CT}$, variable Y is the input voltage $V_{in}$, variable Z is the output voltage $V_{out}$, and the constant A and the coefficients B, C, ..., T of the respective variable terms of the estimation function are values minimizing a cost function of the estimation function calculated as the weighted sum of squares based on a measured output current value and the output current estimate.

In the low-voltage DC-DC converter, the cost function of the estimation function may be defined by the following Equation 2, $$WSS(\beta, \vec{\omega}) = \frac{1}{n}\sum_{i=1}^{n}\omega_i(y_i - \vec{x_i} \cdot \beta)^2 \qquad \text{(Equation 2)}$$

where $y_i$ is the measured output current value, $\vec{x_i} \cdot \beta$ is the output current estimate $I_{o\_est}$ as a result of f(X,Y,Z), and $\beta$ is a set of the constant and the coefficients of the respective variable terms of f(X,Y,Z), that is, A, B, ..., T in Equation 1, $\vec{\omega}$ is a set of weights $\omega_i$, and the weights $\omega_i$ are values determined based on the measured output current value $y_i$, and n is the number of measurement data sets used to derive the estimation function.

In the low-voltage DC-DC converter, wherein the weight $\omega_i$ may be determined as $1/(y_i)^2$.

In the low-voltage DC-DC converter, the output current estimator may include at least two or more multi-variable polynomial estimation functions, and calculate the output current estimate by using an estimation function according to a mode state of the low-voltage DC-DC converter among the at least two or more estimation functions.

The mode state of the low-voltage DC-DC converter may be determined by at least one of the input current calculated based on the CT voltage, a temperature, and the output voltage.

The mode state of the low-voltage DC-DC converter may include a low current mode, a medium current mode and a high current mode of the input current.

A method of driving a low-voltage DC-DC converter, according to one embodiment of the present disclosure, includes: measuring an input voltage, a CT voltage correlated with an input current, and an output voltage; outputting an output current estimate by applying the input voltage, the CT voltage, and the output voltage to an estimation function of a multi-variable polynomial; generating a PWM signal based on the input voltage, the output voltage, and the output current estimate; and controlling each of a plurality of MOSFET switches based on the PWM signal.

In the low-voltage DC-DC converter driving method, the estimation function may be defined by the cubic polynomial of the following Equation 1, $$I_{o\_est} = f(X, Y, Z) = \qquad \text{(Equation 1)}$$
$$A + B \cdot X + C \cdot Y + D \cdot Z + E \cdot XY + F \cdot YZ + G \cdot ZX + H \cdot X^2 +$$
$$I \cdot Y^2 + J \cdot Z^2 + K \cdot XYZ + L \cdot X^2Y + M \cdot XY^2 + N \cdot Y^2Z +$$
$$O \cdot YZ^2 + P \cdot Z^2X + Q \cdot ZX^2 + R \cdot X^3 + S \cdot Y^3 + T \cdot Z^3$$

where, $I_{o\_est}$ is the output current estimate, f(X,Y,Z) is the estimation function, variable X is the CT voltage $V_{CT}$, variable Y is the input voltage $V_{in}$, variable Z is the output voltage $V_{out}$, and the constant A and the coefficients B, C, ..., T of the respective variable terms of the estimation function are values minimizing a cost function of the estimation function calculated as the weighted sum of squares based on a measured output current value and the output current estimate.

In the low-voltage DC-DC converter driving method, the cost function of the estimation function may be defined by the following Equation 2, $$WSS(\beta, \vec{\omega}) = \frac{1}{n}\sum_{i=1}^{n}\omega_i(y_i - \vec{x_i} \cdot \beta)^2$$

where $y_i$ is the measured output current value, $\vec{x_i} \cdot \beta$ is the output current estimate $I_{o\_est}$ as a result of f(X,Y,Z), and $\beta$ is a set of the constant and the coefficients of the respective variable terms of f(X,Y,Z), that is, A, B, ..., T in Equation 1, $\omega$ is a set of weights $\omega_i$, and the weights $\omega_i$ are values determined based on the measured output current value $y_i$, and n is the number of measurement data sets used to derive the estimation function.

In the low-voltage DC-DC converter driving method, the weight $\omega_i$ may be determined as $1/(y_i)^2$.

In the low-voltage DC-DC converter driving method, the outputting an output current estimate by applying the input voltage, the CT voltage, and the output voltage to an estimation function of a multi-variable polynomial may include determining a mode state of the low-voltage DC-DC converter based on at least one of the CT voltage, the output voltage, and a temperature, and deriving the output current estimate by applying the input voltage, the CT voltage, and the output voltage to an estimation function according to the determined mode state.

In the low-voltage DC-DC converter driving method, the mode state of the low-voltage DC-DC converter may include a low current mode, a medium current mode and a high current mode depending on a magnitude of the input current calculated based on the CT voltage.

According to the present disclosure, since the output current of the low-voltage DC-DC converter can be estimated using the input current measured through the CT sensor of the low-voltage DC-DC converter without a separate current sensor, the number of components can be reduced, which reduces the production cost.

In addition, according to the present disclosure, since the output current of the low-voltage DC-DC converter can be estimated with a minimized error rate, the output current can be accurately estimated under low load and high load conditions, which improves fuel efficiency of the vehicle.

Further, according to the present disclosure, since the estimation function for estimating the output current is generated as a multi-variable polynomial, it is possible to reduce the required memory capacity.

Furthermore, according to the present disclosure, since the estimation function is generated as one multi-variable polynomial, it is easy to manage the error rate and a simpler and more accurate estimation model can be obtained in consideration of nonlinearity.

DETAILED DESCRIPTION

Figure 1:
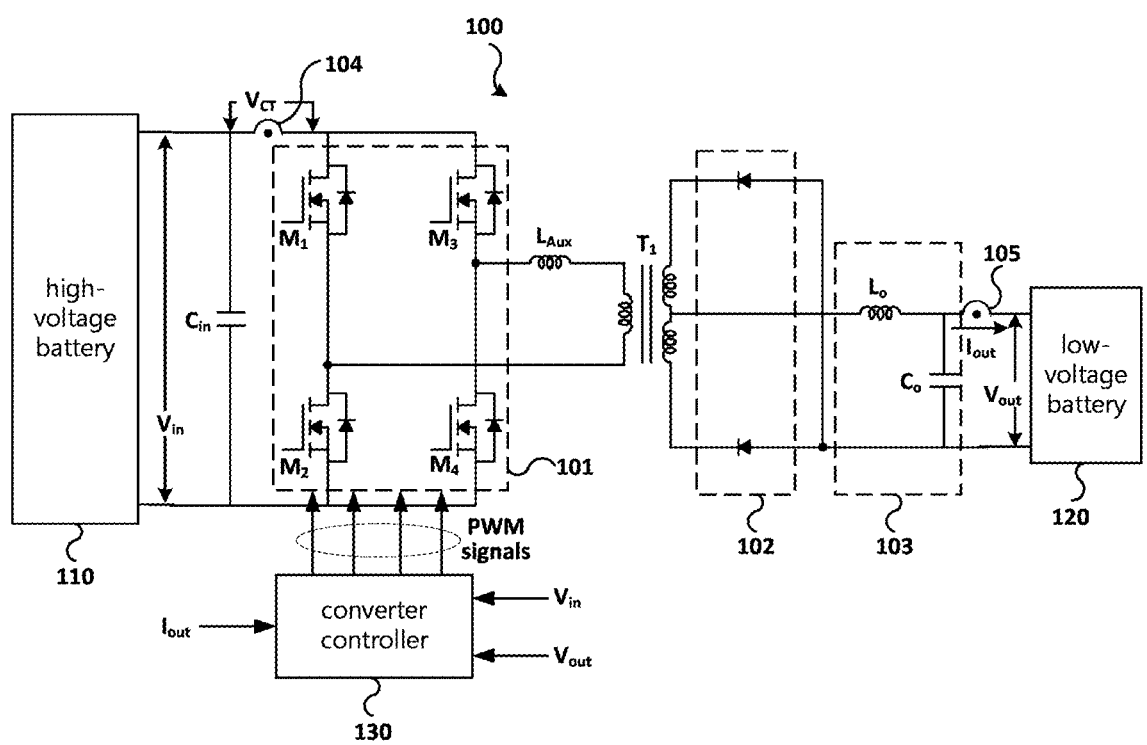
FIG. 1 is a circuit diagram showing a conventional low-voltage DC-DC converter.

Hereinafter, embodiments of the present disclosure will be described in detail so that those skilled in the art can easily practice the present disclosure with reference to the accompanying drawings. Since various changes may be applied to the present disclosure and the present disclosure may have various embodiments, specific embodiments will be illustrated in the drawings and described in detail in the detailed description. However, this is not intended to limit the present disclosure to the specific embodiments, and it should be understood that the present disclosure includes all modifications, equivalents, or substitutes included in the idea and technical scope of the present disclosure.

In order to clearly describe the present disclosure, parts irrelevant to the description are omitted in the drawings, and similar reference numerals are given to similar parts throughout the specification. In addition, while the present disclosure is being described with reference to the drawings, even if the configuration is indicated by the same name, the reference numeral may vary depending on each figure, and the reference numeral is only described for convenience of description, and the concept, characteristic, function, or effect of each component is not to be construed as limited by the corresponding reference numeral.

In describing the drawings, like reference numbers are used for like components. Terms, such as first, second, and the like, may be used to describe various components, but the components should not be limited by the terms. These terms are only used for the purpose of distinguishing one component from another. For example, a first component may be termed a second component, and similarly, the second component may be termed the first component, without departing from the scope of the present disclosure. The term "and/or" includes any combination of a plurality of related listed items or any item of the plurality of related listed items.

Unless defined otherwise, all terms used herein, including technical or scientific terms, have the same meaning as commonly understood by those skilled in the art to which the present disclosure pertains.

Terms such as those defined in commonly used dictionaries should be interpreted as having a meaning consistent with the meanings in the context of the related art, and unless explicitly defined in the present specification, they should not be interpreted in ideal or excessively formal meanings.

Throughout the present specification, when it is described that a part is said to be "connected" to another part, this includes not only the case of being "directly connected" but also the case of being "electrically connected" with another element in between. In addition, when it is described that a part "comprises or includes" a certain component, it means that the part may further include other components, not excluding other components unless otherwise stated, and it should be understood that the possibility of the presence or addition of one or more other characteristics, numbers, steps, operations, components, parts, or combinations thereof is not preclude.

In this specification, 'unit' or 'module' includes a unit realized by hardware or software, or a unit realized using both. In addition, one unit may be realized by using two or more pieces of hardware, and two or more units may be realized by a single piece of hardware.

Hereinafter, an apparatus and method for estimating an output current of a low-voltage DC-DC converter according to the present disclosure will be described in detail with reference to the accompanying drawings.

Figure 2:
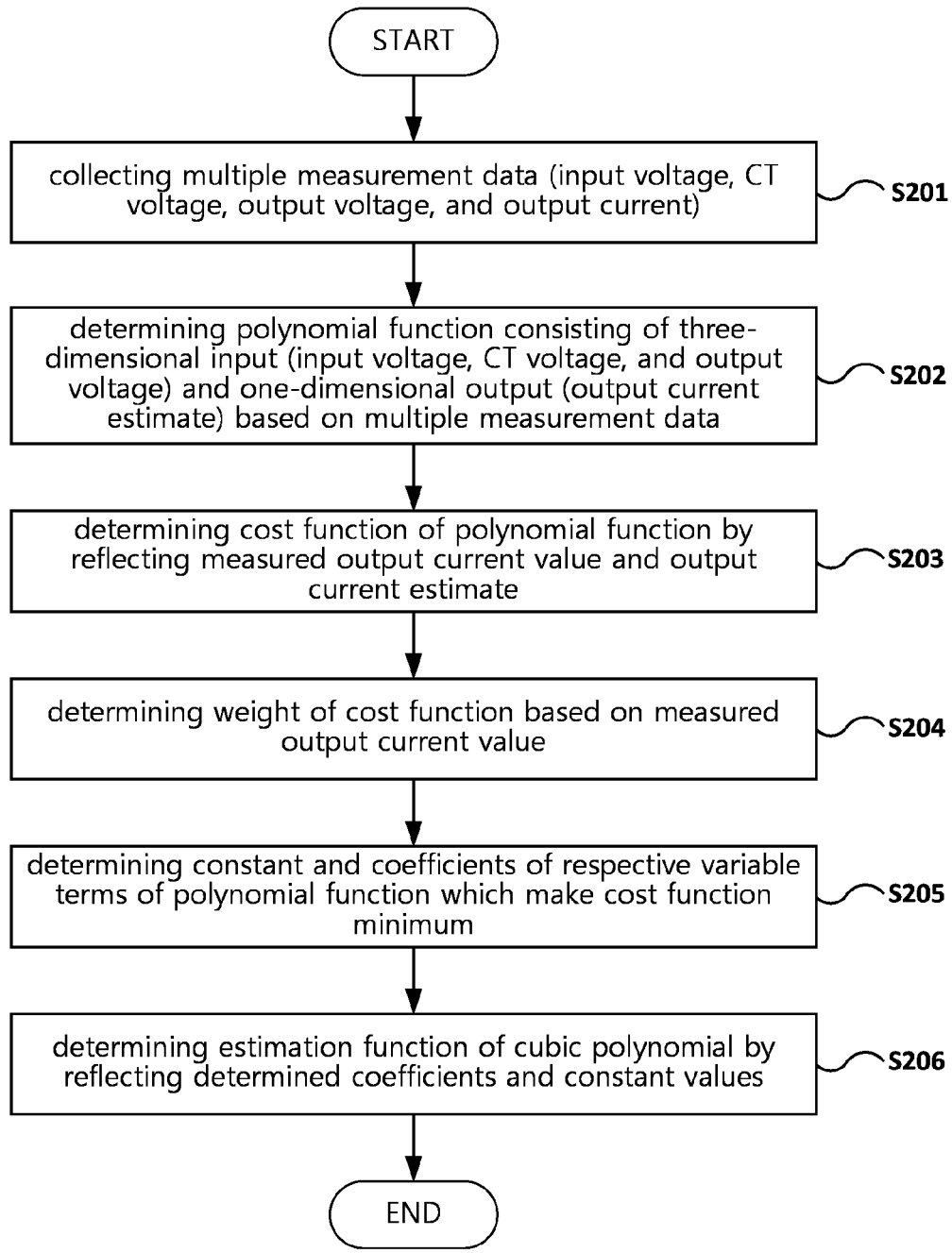
FIG. 2 is an operational flowchart showing a process of generating an output current estimation function according to one embodiment of the present disclosure.

FIG. 2 is an operational flowchart showing a process of generating an output current estimation function according to one embodiment of the present disclosure. The output current estimation function of the present disclosure can be generated in a conventional computer system.

First, in a low-voltage DC-DC converter 100 as shown in FIG. 1, an input voltage $V_{in}$, a CT voltage $V_{CT}$ across a CT sensor 104, an output voltage $V_{out}$, and an output current $I_{out}$ of a current sensor 105 are measured and collected, respectively (S201). The CT voltage $V_{CT}$ of the CT sensor 104 is correlated with the input current flowing on the primary side of the low-voltage DC-DC converter 100, and the input current is correlated with a load. A measurement data set consisting of the input voltage $V_{in}$, the CT voltage $V_{CT}$ across the CT sensor 104, the output voltage $V_{out}$ and the output current $I_{out}$ of the current sensor 105 that is measured is used to derive an output current estimation function, and n measurement data sets may be measured and used.

Based on a plurality of measurement data, a polynomial function consisting of multiple variables, in particular, a three-dimensional input (input voltage, CT voltage, and output voltage) and a one-dimensional output (output current estimate), is determined (S202). In this case, the multi-variable polynomial function may be determined by a cubic polynomial of Equation 1.

$$I_{o\_est} = f(X, Y, Z) = \quad \text{(Equation 1)}$$
$$A + B \cdot X + C \cdot Y + D \cdot Z + E \cdot XY + F \cdot YZ + G \cdot ZX + H \cdot X^2 +$$
$$I \cdot Y^2 + J \cdot Z^2 + K \cdot XYZ + L \cdot X^2Y + M \cdot XY^2 + N \cdot Y^2Z +$$
$$O \cdot YZ^2 + P \cdot Z^2X + Q \cdot ZX^2 + R \cdot X^3 + S \cdot Y^3 + T \cdot Z^3$$

where, $I_{o\_est}$ is the output current estimate, variable X is the CT voltage $V_{CT}$, variable Y is the input voltage $V_{in}$, and variable Z is the output voltage $V_{out}$.

A is a constant of the polynomial function, B to T are coefficients of the respective variable terms of the polynomial function, and may be values derived by curve fitting three-dimensional inputs (input voltage, CT voltage, and output voltage).

$f(X,Y,Z)$ may be expressed as $\vec{x_t} \cdot B$. $\vec{x_t}$ is a set of variable terms consisting of variables X, Y, and Z, and β may be a set of the constant and the coefficients, that is, (A, B, . . . , T).

Next, a cost function of the polynomial function of Equation 1 is determined by reflecting the measured output current value $I_{out}$ and the output current estimate $I_{o\_est}$ estimated by Equation 1 (S203). A cost function in the form of a mean squared error of a typical polynomial function derives an optimal solution with a minimum error based on summation of squares of errors. However, in most sensors, an error rate, not the error, needs to be managed within a specific ratio. Accordingly, in the present disclosure, a weighted mean square error method is proposed as a method of minimizing the error rate rather than the error.

The cost function of the polynomial function of Equation 1 is a weighted sum of squares (WSS) of errors between the measured output current value and the output current estimate, and may be determined as in Equation 2. That is, the output current estimate $I_{o\_est}$ may be a value calculated based on an estimation function that minimizes the cost function of Equation 2 calculated as a weighted sum of squares.

$$WSS(\beta, \vec{\omega}) = \frac{1}{n}\sum_{i=1}^{n}\omega_i(y_i - \vec{x_i} \cdot \beta)^2 \quad \text{(Equation 2)}$$

where, $y_i$ is the measured output current value, and $\vec{x_i} \cdot \beta$ is the output current estimate. In the present disclosure, $\beta$ that enables to minimize the sum obtained after multiplying the square of the error between the measured output current value $y_i$ and the output current estimate $\vec{x_i} \cdot \beta$ by the weight $\omega_i$ needs to be obtained. $\beta$ is a set of the constant and coefficients of f(X, Y, Z), that is, (A, B, . . . , T) in Equation 1. In addition, n may be the number of measurement data sets used to derive the output current estimation function.

Next, the weight $\omega_i$ is determined based on the measured output current value $y_i$ (S204). The weight $\omega_i$ may be $1/(y_i)^2$. When the weight is determined in this way, the cost function of Equation 2 may be expressed as the following Equation 3.

$$WSS(\beta, \vec{\omega}) = \frac{1}{n}\sum_{i=1}^{n}\left(1 - \frac{\vec{x_i} \cdot \beta}{y_i}\right)^2 \quad \text{(Equation 3)}$$

where, since $$\left(1 - \frac{\vec{x_i} \cdot \beta}{y_i}\right)$$

means the error rate, it the weight $\omega_i$ is determined as $1/(y_i)^2$, an estimation function having the lowest error rate between the measured output current value and the output current estimate may be determined. Here, the error rate may mean a ratio between the measured output current value and "the error between the measured output current value and the output current estimate".

Next, $\beta$, that is, the constant and the coefficients of the respective variable terms of the polynomial function of Equation 1, which makes the cost function minimum, is determined (S205).

Next, the estimation function of the cubic polynomial is determined by reflecting the coefficients and constant values of the respective variable terms determined in step S205 (S206).

In the present disclosure, an estimation function of two or more multi-variable polynomials may be determined by repeating steps S201 to S206 according to the mode state of the low-voltage DC-DC converter. For example, according to the magnitude of the input current of the low-voltage DC-DC converter, the mode state may be classified into a low current (0 to 10 A) mode, a medium current (10 to 30 A) mode, and a high current (30 to 170 A) mode, and a separate multi-variable polynomial estimation function may be determined for each mode of input current. In addition, the mode state may be classified according to the temperature or output voltage of the low-voltage DC-DC converter, and a separate multi-variable polynomial estimation function may be determined for each classified mode.

Figure 3:
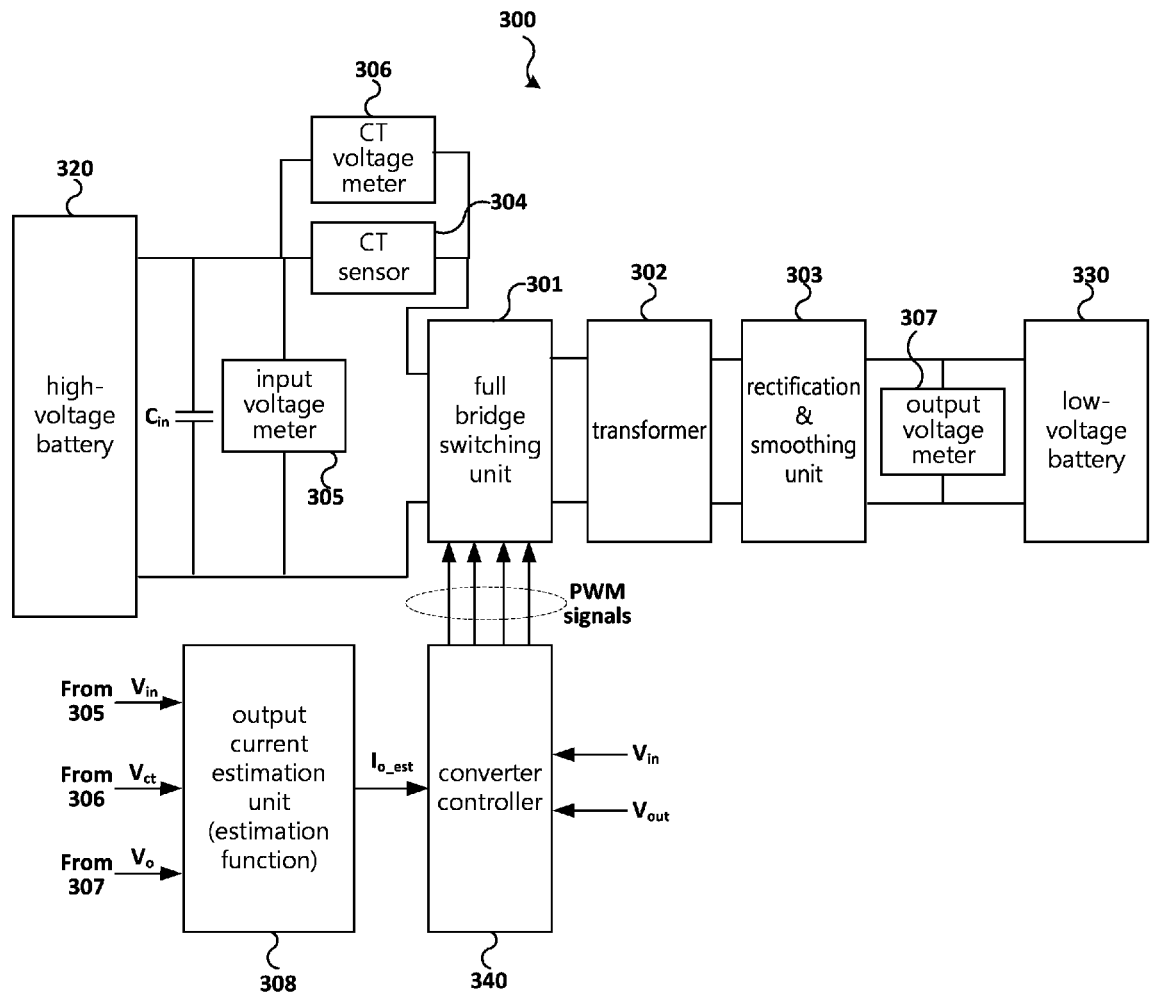
FIG. 3 is a block diagram showing a low-voltage DC-DC converter including an output current estimating apparatus according to the present disclosure.

FIG. 3 is a block diagram showing a low-voltage DC-DC converter including the output current estimating apparatus according to the present disclosure.

The low-voltage DC-DC converter 300 of the present disclosure includes a full bridge switch 301 that converts a direct current (DC) high voltage of a high voltage battery 320 into an alternating current (AC) through high-speed switching of four MOSFET switches, a transformer 302 for stepping down the AC high voltage output from the full bridge switch 301, a rectifier & smoothing circuit 303 which rectifies and smoothes the stepped-down AC voltage, converts it into a DC voltage, and supplies it to the low voltage battery 330 and electric loads, a CT sensor 304 that detects an input current, and an output current estimating apparatus for estimating an output current based on the input current.

The output current estimating apparatus of the present disclosure includes an input voltage meter 305 for measuring the input voltage $V_{in}$ of the low-voltage DC-DC converter, a CT voltage meter 306 for measuring the CT voltage $V_{CT}$ of the CT sensor 304, an output voltage meter 307 for measuring the output voltage $V_{out}$ of the low-voltage DC-DC converter, and an output current estimator 308 that outputs an output current estimate $I_{o\_est}$ by applying the input voltage $V_{in}$, the CT voltage $V_{CT}$, and the output voltage $V_{out}$ to the estimation function.

The output current estimator 308 calculates the output current estimate $I_{o\_est}$ by applying multiple variables, that is, the input voltage $V_{in}$, the CT voltage $V_{CT}$, and the output voltage $V_{out}$ to the estimation function of Equation 1.

$$\begin{aligned}I_{o\_est} = f(X, Y, Z) = \\ A + B \cdot X + C \cdot Y + D \cdot Z + E \cdot XY + F \cdot YZ + G \cdot ZX + H \cdot X^2 + \\ I \cdot Y^2 + J \cdot Z^2 + K \cdot XYZ + L \cdot X^2Y + M \cdot XY^2 + N \cdot Y^2Z + \\ O \cdot YZ^2 + P \cdot Z^2X + Q \cdot ZX^2 + R \cdot X^3 + S \cdot Y^3 + T \cdot Z^3\end{aligned} \quad \text{(Equation 1)}$$

where, $I_{o\_est}$ is the output current estimate, variable X is the CT voltage $V_{CT}$, variable Y is the input voltage $V_{in}$, and variable Z is the output voltage $V_{out}$.

In Equation 1, the constant and the coefficients of the variable terms may be values that minimize the cost function of Equation 2 calculated as a weighted sum of squares.

$$WSS(\beta, \vec{\omega}) = \frac{1}{n}\sum_{i=1}^{n}\omega_i(y_i - \vec{x_i} \cdot \beta)^2 \quad \text{(Equation 2)}$$

where, $y_i$ is the measured output current value, and $\vec{x_i} \cdot \beta$ is the output current estimate. $\beta$ is a set of the constant and the coefficients of f(X, Y, Z), that is, (A, B, . . . , T) in Equation 1, and n is the number of measurement data sets used to derive the estimation function. $\vec{\omega}$ is a set of weights $\omega_i$, and the weight $\omega_i$ is a value determined based on the measured output current value $y_i$, and may be $1/(y_i)^2$.

A converter controller 340 receives the input voltage $V_{in}$, the output voltage $V_{out}$ of the low-voltage DC-DC converter 300, and the output current estimate $I_{o\_est}$ from the output current estimator 308, and generates a PWM signal for controlling each of the MOSFET switches constituting the full bridge switch 301 to output it the full bridge switch 301.

In this case, the output current estimator 308 may include at least two estimation functions for each mode, and calculate the output current estimate $I_{o\_est}$ by using an estimation function according to the mode state of the low-voltage DC-DC converter among at least two or more estimation functions for each mode. For example, the output current estimator 308 may calculate the magnitude of the input current based on the CT voltage $V_{CT}$, and classify the mode state of the low-voltage DC-DC converter into the low current (0 to 10 A) mode, the medium current (10 to 30 A) mode, and the high current (30 to 170 A) mode according to the magnitude of the input current. The output current estimator 308 may include a low current mode estimation function, a medium current mode estimation function, and a high current mode estimation function, and select one of the low current mode estimation function, the medium current mode estimation function, and the high current mode estimation function according to the magnitude of the input current calculated based on the CT voltage $V_{CT}$ to calculate the output current estimate $I_{o\_est}$.

The mode state of the low-voltage DC-DC converter may be classified based on the temperature or output voltage of the low-voltage DC-DC converter. That is, the mode state may be classified based on the temperature or output voltage, and the output current estimator 308 may include an estimation function applied for each classified mode.

Figure 4:
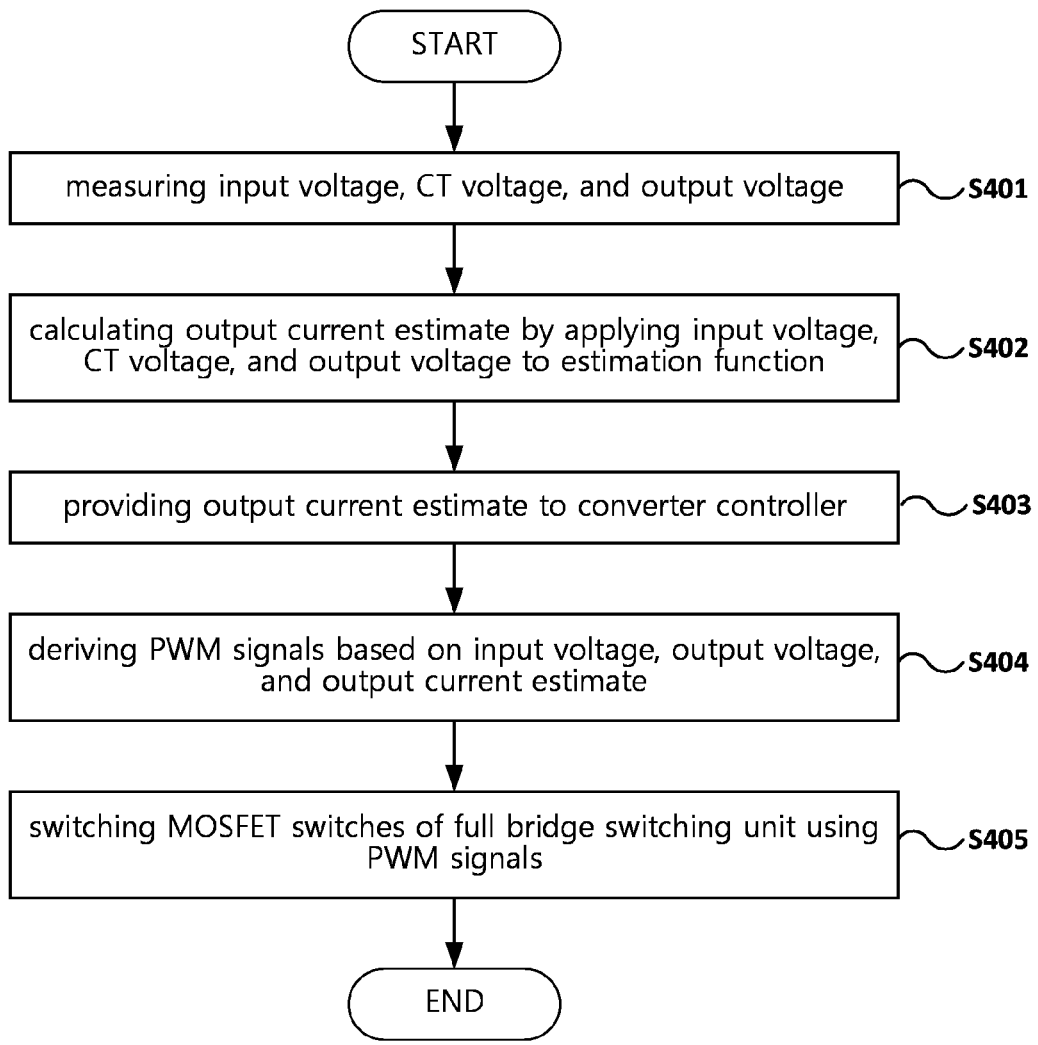
FIG. 4 is a flowchart showing a method of driving the low-voltage DC-DC converter including the output current estimating apparatus according to the present disclosure.

FIG. 4 is a flowchart showing a method of driving the low-voltage DC-DC converter including the output current estimating apparatus according to the present disclosure.

The input voltage $V_{in}$, the CT voltage $V_{CT}$, and the output voltage $V_{out}$ are measured using an input voltage meter, a CT voltage meter, and an output voltage meter, respectively (S401).

The output current estimate $I_{o\_est}$ is calculated by applying multiple variables, that is, the input voltage $V_{in}$, the CT voltage $V_{CT}$, and the output voltage $V_{out}$ to the estimation function of Equation 1 (S402).

$$I_{o\_est} = f(X, Y, Z) = \quad \text{(Equation 1)}$$
$$A + B \cdot X + C \cdot Y + D \cdot Z + E \cdot XY + F \cdot YZ + G \cdot ZX + H \cdot X^2 +$$
$$I \cdot Y^2 + J \cdot Z^2 + K \cdot XYZ + L \cdot X^2Y + M \cdot XY^2 + N \cdot Y^2Z +$$
$$O \cdot YZ^2 + P \cdot Z^2X + Q \cdot ZX^2 + R \cdot X^3 + S \cdot Y^3 + T \cdot Z^3$$

where, $I_{o\_est}$ is the output current estimate, variable X is the CT voltage $V_{CT}$, variable Y is the input voltage $V_{in}$, and variable Z is the output voltage $V_{out}$.

In Equation 1, the constant and the coefficients of the variable terms may be values that minimize the cost function of Equation 2 calculated as a weighted sum of squares.

$$WSS(\beta, \vec{\omega}) = \frac{1}{n}\sum_{i=1}^{n}\omega_i(y_i - \vec{x_i} \cdot \beta)^2 \quad \text{(Equation 2)}$$

where, $y_i$ is the measured output current value, and $\vec{x_i} \cdot \beta$ is the output current estimate. $\beta$ is a set of the constant and the coefficients of $f(X, Y, Z)$, that is, $(A, B, \ldots, T)$ in Equation 1, and n is the number of measurement data sets used to derive the estimation function. $\vec{\omega}$ is a set of weights $\omega_i$, and the weight $\omega_i$ is a value determined based on the measured output current value $y_i$, and may be $1/(y_i)^2$.

The output current estimate $I_{o\_est}$ derived in step S402 is provided to the converter controller (S403), and the converter controller derives a PWM signal based on the input voltage $V_{in}$, the output voltage $V_{out}$, and the output current estimate $I_{o\_est}$ (S404).

The PWM signal derived from the converter controller is provided to each of the four MOSFET switches of the full bridge switch to switch the MOSFET switches (S405).

In step S402, the mode state of the low-voltage DC-DC converter is determined based on at least one value of the CT voltage $V_{CT}$, the output voltage $V_{out}$, and the temperature, and the output current estimate $I_{o\_est}$ may be calculated by applying the input voltage $V_{in}$, the CT voltage $V_{CT}$, and the output voltage $V_{out}$ to the estimation function according to the determined mode state of the low-voltage DC-DC converter.

Figure 5A:
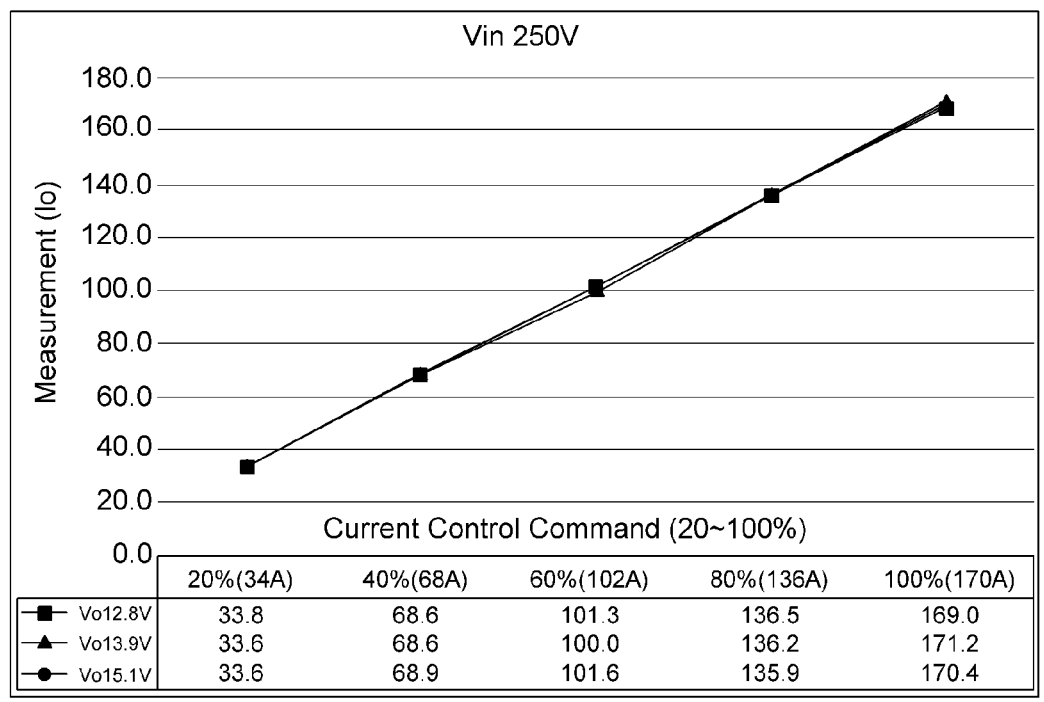
FIGS. 5A to 5C are graphs showing the difference between an output current estimated by the output current estimating apparatus of the present disclosure and the output current actually measured.
Figure 5B:
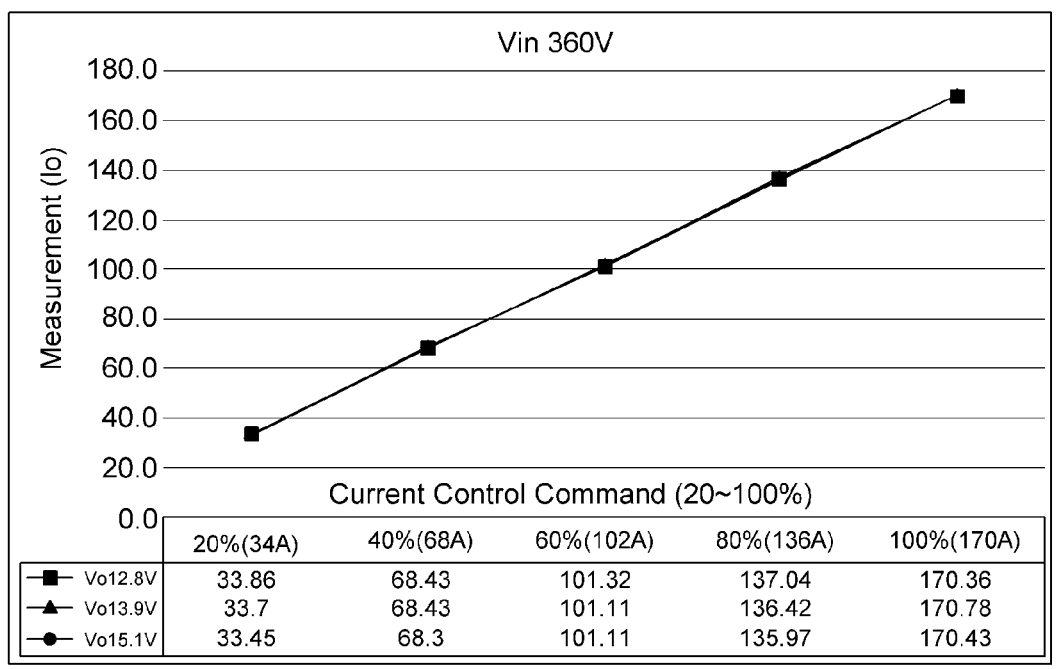
Figure 5C:
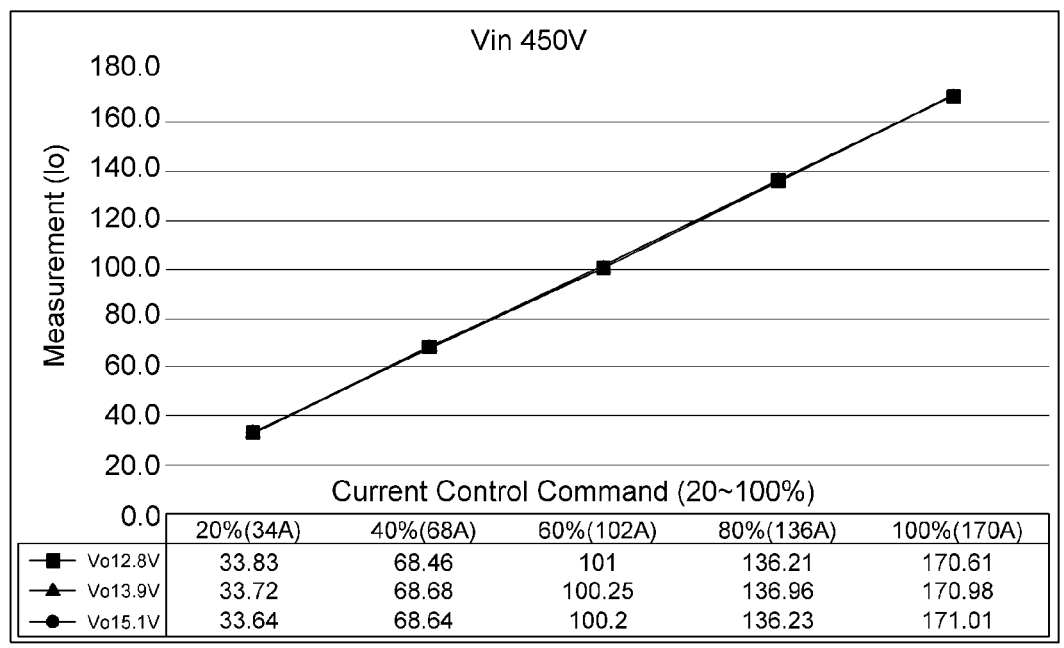

FIGS. 5A to 5C are graphs showing the difference between the output current estimated by the output current estimating apparatus of the present disclosure and the output current actually measured.

FIG. 5A shows the estimated output current versus the measured output current for each load when the input voltage is 250 V. FIG. 5B shows the estimated output current versus the measured output current for each load when the input voltage is 360 V, and FIG. 5C shows the estimated output current versus the measured output current for each load when the input voltage is 450 V.

Table 1 summarizes the error rate between the measured output current and the estimated output current under each condition. Referring to Table 1, it can be seen that the output current estimated by the present disclosure is within a 2% error rate compared to the actual output current.

TABLE 1

| Vin | Iout | Vo 12.8 V | Vo 13.9 V | Vo 15.1 V |
|---|---|---|---|---|
| 250 V | 20% (34 A) | 0.5% | 1.1% | 1.1% |
|  | 40% (68 A) | 0.8% | 0.9% | 1.3% |
|  | 60% (102 A) | 0.6% | 1.9% | 0.4% |
|  | 80% (136 A) | 0.4% | 0.1% | 0.1% |
|  | 100% (170 A) | 0.6% | 0.7% | 0.2% |
| 360 V | 20% (34 A) | 0.4% | 0.9% | 1.6% |
|  | 40% (68 A) | 0.6% | 0.6% | 0.4% |
|  | 60% (102 A) | 0.7% | 0.9% | 0.9% |
|  | 80% (136 A) | 0.8% | 0.3% | 0.0% |
|  | 100% (170 A) | 0.2% | 0.5% | 0.3% |
| 450 V | 20% (34 A) | 0.5% | 0.8% | 1.1% |
|  | 40% (68 A) | 0.7% | 1.0% | 0.9% |
|  | 60% (102 A) | 1.0% | 1.7% | 1.8% |
|  | 80% (136 A) | 0.2% | 0.0% | 0.2% |
|  | 100% (170 A) | 0.4% | 0.6% | 0.6% |

The embodiments of the present disclosure described above are for illustrative purposes, and those skilled in the art may understand that the embodiments can be easily modified into other specific forms without changing the technical idea or essential features of the present disclosure. Accordingly, the embodiments described above should be understood as illustrative in all respects and not limiting. For example, each component described as a single type may be implemented in a distributed manner, and similarly, components described as distributed may be implemented in a combined form.

The scope of the present disclosure is defined by the following claims rather than the detailed description above, and all changes or modifications derived from the meaning and scope of the claims and equivalent concepts should be construed as being included in the scope of the present disclosure.

DESCRIPTION OF REFERENCE NUMERALS

| | |
|---|---|
| 300: low-voltage DC-DC converter | 301: full bridge switch |
| 302: transformer | 303: Rectifier & smoothing circuit |
| 304: CT sensor | 305: input voltage meter |
| 306: CT voltage meter | 307: output voltage meter |
| 308: output current estimator | 320: high-voltage battery |
| 330: low-voltage battery | 340: converter controller |

What is claimed is:

1. An apparatus for estimating an output current of a low-voltage DC-DC converter, the apparatus comprising:
an input voltage meter connected with the low-voltage DC-DC converter and configured to measure an input voltage ($V_{in}$) of the low-voltage DC-DC converter;
a current transformer (CT) voltage meter connected with the low-voltage DC-DC converter and configured to measure a CT voltage ($V_{CT}$) correlated with an input current of the low-voltage DC-DC converter;
an output voltage meter connected with the low-voltage DC-DC converter and configured to measure an output voltage ($V_{out}$) of the low-voltage DC-DC converter; and
an output current estimator connected with the input voltage meter, the CT voltage meter, and the output voltage meter, and configured to output an output current estimate of the low-voltage DC-DC converter by applying the measured input voltage, CT voltage, and output voltage to an estimation function of a multi-variable polynomial.

2. The apparatus of claim 1, wherein the estimation function is defined by the cubic polynomial of the following Equation 1, $$I_{o\_est} = f(X, Y, Z) = \quad \text{[Equation 1]}$$
$$A + B \cdot X + C \cdot Y + D \cdot Z + E \cdot XY + F \cdot YZ + G \cdot ZX + H \cdot X^2 +$$
$$I \cdot Y^2 + J \cdot Z^2 + K \cdot XYZ + L \cdot X^2Y + M \cdot XY^2 + N \cdot Y^2Z +$$
$$O \cdot YZ^2 + P \cdot Z^2X + Q \cdot ZX^2 + R \cdot X^3 + S \cdot Y^3 + T \cdot Z^3$$

where, $I_{o\_est}$ is the output current estimate, f(X,Y,Z) is the estimation function, variable X is the CT voltage ($V_{CT}$), variable Y is the input voltage ($V_{in}$), variable Z is the output voltage ($V_{out}$), and the constant A and the coefficients B, C, D, E, F, G, H, I, J, K, L, M, N, O, P, Q, R, S, and T of the respective variable terms of the estimation function are values minimizing a cost function of the estimation function calculated as a weighted sum of squares based on a measured output current value of the low-voltage DC-DC converter and the output current estimate ($I_{o\_est}$) of the output current estimator.

3. The apparatus of claim 2, wherein the cost function of the estimation function is defined by the following Equation 2, $$WSS(\beta, \vec{\omega}) = \frac{1}{n}\sum_{i=1}^{n}\omega_i(y_i - \vec{x_i} \cdot \beta)^2 \quad \text{[Equation 2]}$$

where $y_i$ is the measured output current value, $\vec{x_i} \cdot \beta$ is the output current estimate ($I_{o\_est}$) as a result of f(X,Y,Z), and β is a set of the constant and the coefficients of the respective variable terms of f(X,Y,Z), that is, A, B, C, D, E, F, G, H, I, J, K, L, M, N, O, P, Q, R, S, and T in Equation 1, ω is a set of weights di, and the weights $\omega_i$ are values determined based on the measured output current value $y_i$, and n is the number of measurement data sets used to derive the estimation function.

4. The apparatus of claim 3, wherein the weight $\omega_i$ is determined as $1/(y_i)^2$.

5. The apparatus of claim 1, wherein the output current estimator includes at least two or more multi-variable polynomial estimation functions, and calculates the output current estimate by using an estimation function according to a mode state of the low-voltage DC-DC converter among the at least two or more estimation functions.

6. The apparatus of claim 5, wherein the mode state of the low-voltage DC-DC converter is determined by at least one of the input current of the low-voltage DC-DC converter calculated based on the CT voltage, a temperature, and the output voltage.

7. The apparatus of claim 6, wherein the mode state of the low-voltage DC-DC converter includes a low current mode, a medium current mode and a high current mode of the input current.

8. A low-voltage DC-DC converter comprising:
a full bridge switch having a plurality of MOSFET switches, connected with a high-voltage battery, and configured to convert a direct current (DC) high voltage of a high-voltage battery into an alternating current (AC) through high-speed switching of the plurality of MOSFET switches;
a transformer connected with the full bridge switch and configured to step down the AC high voltage output from the full bridge switch;
a rectifier and smoothing circuit connected with the transformer and configured to rectify the stepped down AC voltage output, convert the rectified AC voltage output into DC voltage output, and supply the converted DC voltage output to a low-voltage battery and an electric load;
a current transformer (CT) sensor connected with the full bridge switch and the high-voltage battery and configured to detect an input current of the full bridge switch;
an input voltage meter connected with the full bridge switch and configured to measure an input voltage ($V_{in}$) of the full bridge switch;
a CT voltage meter connected with the CT sensor and configured to measure a CT voltage ($V_{CT}$) correlated with the input current;
an output voltage meter connected with the rectifier and smoothing circuit and configured to measure the converted DC voltage output ($V_{out}$);
an output current estimator connected with the input voltage meter, the CT voltage meter, and the output voltage meter, and configured to output an output current estimate of the low-voltage DC-DC converter by applying the measured input voltage ($V_{in}$), CT voltage ($V_{CT}$), and converted DC voltage output ($V_{out}$) to an estimation function of a multi-variable polynomial; and a converter controller connected with the output current estimator and the full bridge switch and configured to generate a pulse width modulation (PWM) signal for controlling each of the plurality of MOSFET switches based on the measured input voltage ($V_{in}$), the converted DC voltage output ($V_{out}$), and the output current estimate.

9. The low-voltage DC-DC converter of claim 8, wherein the estimation function is defined by the cubic polynomial of the following Equation 1, $$I_{o\_est} = f(X, Y, Z) = \quad \text{[Equation 1]}$$
$$A + B \cdot X + C \cdot Y + D \cdot Z + E \cdot XY + F \cdot YZ + G \cdot ZX + H \cdot X^2 +$$
$$I \cdot Y^2 + J \cdot Z^2 + K \cdot XYZ + L \cdot X^2Y + M \cdot XY^2 + N \cdot Y^2Z +$$
$$O \cdot YZ^2 + P \cdot Z^2X + Q \cdot ZX^2 + R \cdot X^3 + S \cdot Y^3 + T \cdot Z^3$$

where, $I_{o\_est}$ is the output current estimate, f(X,Y,Z) is the estimation function, variable X is the CT voltage ($V_{CT}$), variable Y is the input voltage ($V_{in}$), variable Z is the output voltage ($V_{out}$), and the constant A and the coefficients B, C, D, E, F, G, H, I, J, K, L, M, N, O, P, Q, R, S, and T of the respective variable terms of the estimation function are values minimizing a cost function of the estimation function calculated as a weighted sum of squares based on a measured output current value of the low-voltage DC-DC converter and the output current estimate ($I_{o\_est}$) of the output current estimator.

10. The low-voltage DC-DC converter of claim 9, wherein the cost function of the estimation function is defined by the following Equation 2, $$WSS(\beta, \vec{\omega}) = \frac{1}{n}\sum_{i=1}^{n}\omega_i(y_i - \vec{x_i} \cdot \beta)^2 \quad \text{[Equation 2]}$$

where $y_i$ is the measured output current value, $\vec{x_i} \cdot \beta$ is the output current estimate ($I_{o\_est}$) as a result of f(X,Y,Z), and $\beta$ is a set of the constant and the coefficients of the respective variable terms of f(X,Y,Z), that is, A, B, C, D, E, F, G, H, I, J, K, L, M, N, O, P, Q, R, S, and T in Equation 1, $\vec{\omega}$ is a set of weights $\omega_i$, and the weights $\omega_i$ are values determined based on the measured output current value $y_i$, and n is the number of measurement data sets used to derive the estimation function.

11. The low-voltage DC-DC converter of claim 10, wherein the weight $\omega_i$ is determined as $1/(y_i)^2$.

12. The low-voltage DC-DC converter of claim 8, wherein the output current estimator includes at least two or more multi-variable polynomial estimation functions, and calculates the output current estimate by using an estimation function according to a mode state of the low-voltage DC-DC converter among the at least two or more estimation functions.

13. The low-voltage DC-DC converter of claim 12, wherein the mode state of the low-voltage DC-DC converter is determined by at least one of the input current of the low-voltage DC-DC converter calculated based on the CT voltage, a temperature, and the output voltage.

14. The low-voltage DC-DC converter of claim 13, wherein the mode state of the low-voltage DC-DC converter includes a low current mode, a medium current mode and a high current mode of the input current.

15. A method of driving a low-voltage DC-DC converter having a plurality of MOSFET switches, the method comprising:

measuring an input voltage of the low-voltage DC-DC converter, a current transformer (CT) voltage correlated with an input current of the low-voltage DC-DC converter, and an output voltage of the low-voltage DC-DC converter;

outputting an output current estimate by applying the measured input voltage, CT voltage, and output voltage to an estimation function of a multi-variable polynomial;

generating a pulse width modulation (PWM) signal based on the input voltage, the output voltage, and the output current estimate; and controlling each of the plurality of MOSFET switches based on the PWM signal.

16. The method of claim 15, wherein the estimation function is defined by the cubic polynomial of the following Equation 1, $$I_{o\_est} = f(X, Y, Z) = \quad \text{[Equation 1]}$$
$$A + B \cdot X + C \cdot Y + D \cdot Z + E \cdot XY + F \cdot YZ + G \cdot ZX + H \cdot X^2 +$$
$$I \cdot Y^2 + J \cdot Z^2 + K \cdot XYZ + L \cdot X^2Y + M \cdot XY^2 + N \cdot Y^2Z +$$
$$O \cdot YZ^2 + P \cdot Z^2X + Q \cdot ZX^2 + R \cdot X^3 + S \cdot Y^3 + T \cdot Z^3$$

where, $I_{o\_est}$ is the output current estimate, f(X,Y,Z) is the estimation function, variable X is the CT voltage ($V_{CT}$), variable Y is the input voltage ($V_{in}$), variable Z is the output voltage ($V_{out}$), and the constant A and the coefficients B, C, D, E, F, G, H, I, J, K, L, M, N, O, P, Q, R, S, and T of the respective variable terms of the estimation function are values minimizing a cost function of the estimation function calculated as a weighted sum of squares based on a measured output current value of the low-voltage DC-DC converter and the output current estimate ($I_{o\_est}$) of the output current estimator.

17. The method of claim 16, wherein the cost function of the estimation function is defined by the following Equation 2, $$WSS(\beta, \vec{\omega}) = \frac{1}{n}\sum_{i=1}^{n}\omega_i(y_i - \vec{x_i} \cdot \beta)^2 \quad \text{[Equation 2]}$$

where $y_i$ is the measured output current value, $\vec{x_i} \cdot \beta$ is the output current estimate ($I_{o\_est}$) as a result of f(X,Y,Z), and $\beta$ is a set of the constant and the coefficients of the respective variable terms of f(X,Y,Z), that is, A, B, C, D, E, F, G, H, I, J, K, L, M, N, O, P, Q, R, S, and T in Equation 1, $\omega$ is a set of weights $\omega_i$, and the weights $\omega_i$ are values determined based on the measured output current value $y_i$, and n is the number of measurement data sets used to derive the estimation function.

18. The method of claim 17, wherein the weight $\omega_i$ is determined as $1/(y_i)^2$.

19. The method claim 15, wherein the outputting an output current estimate by applying the measured input voltage, CT voltage, and output voltage to an estimation function of a multi-variable polynomial includes:
   determining a mode state of the low-voltage DC-DC converter based on at least one of the CT voltage, the output voltage, and a temperature; and
   deriving the output current estimate by applying the input voltage, the CT voltage, and the output voltage to an estimation function according to the determined mode state.

20. The method of claim 19, wherein the mode state of the low-voltage DC-DC converter includes a low current mode, a medium current mode and a high current mode depending on a magnitude of the input current calculated based on the CT voltage.

\* \* \* \* \*